US008104287B2

(12) United States Patent
Fischer et al.

(10) Patent No.: US 8,104,287 B2

(45) Date of Patent: Jan. 31, 2012

(54) RETAINING ELEMENT AND HEAT SHIELD ELEMENT FOR A HEAT SHIELD AND COMBUSTION CHAMBER PROVIDED WITH A HEAT SHIELD

(75) Inventors: Marcus Fischer, Niederbreitbach (DE); Marc Tertilt, Hattingen (DE); Bernd Vonnemann, Gladbeck (DE)

(73) Assignee: Siemens Aktiengesellschaft, Munich (DE)

( * ) Notice: Subject to any disclaimer, the term of this patent is extended or adjusted under 35 U.S.C. 154(b) by 1138 days.

(21) Appl. No.: 11/918,607

(22) PCT Filed: Apr. 18, 2006

(86) PCT No.: PCT/EP2006/061623

§ 371 (c)(1), (2), (4) Date: Oct. 16, 2007

(87) PCT Pub. No.: WO2006/111518

PCT Pub. Date: Oct. 26, 2006

(65) Prior Publication Data

US 2009/0056339 A1 Mar. 5, 2009

(51) Int. Cl.
*F02C 1/00* (2006.01)
*F02G 3/00* (2006.01)

(52) U.S. Cl. ............................... 60/752; 60/796; 60/753

(58) Field of Classification Search .................... 60/752, 60/753, 796
See application file for complete search history.

(56) References Cited

U.S. PATENT DOCUMENTS

| | | | | |
|---|---|---|---|---|
| 5,363,620 | A | 11/1994 | Liu | |
| 5,431,020 | A * | 7/1995 | Maghon | 60/753 |
| 5,899,151 | A | 5/1999 | Merkle, Jr. et al. | |
| 7,677,044 | B2 * | 3/2010 | Barbeln et al. | 60/752 |
| 2003/0177770 | A1 | 9/2003 | Hofmann et al. | |

FOREIGN PATENT DOCUMENTS

| | | |
|---|---|---|
| DE | 89 08 264 | 11/1989 |
| DE | 41 14 768 A1 | 11/1991 |
| EP | 0 558 540 B1 | 9/1993 |
| EP | 1 561 997 A1 | 8/2005 |
| FR | 2 685 035 | 6/1993 |

* cited by examiner

*Primary Examiner* — Ehud Gartenberg
*Assistant Examiner* — Andrew Nguyen

(57) ABSTRACT

A retaining element for retaining a heat shield element on a support structure comprises at least one fixing section adapted to fix the retaining element to the support structure and at least one retaining section adapted to engage with an engaging groove present on a periphery of the heat shield element. A projection is arranged on the retaining element in such a manner that it projects in the direction of the heat shield element when retaining a heat shield element.

2 Claims, 5 Drawing Sheets

RETAINING ELEMENT AND HEAT SHIELD ELEMENT FOR A HEAT SHIELD AND COMBUSTION CHAMBER PROVIDED WITH A HEAT SHIELD

CROSS REFERENCE TO RELATED APPLICATIONS

This application is the US National Stage of International Application No. PCT/EP2006/061623, filed Apr. 18, 2006 and claims the benefit thereof. The International Application claims the benefits of European application No. 05008510.9 filed Apr. 19, 2005, both of the applications are incorporated by reference herein in their entirety.

FIELD OF INVENTION

The present invention relates to retaining elements and heat shield elements for constructing a heat shield secured to a support structure and a combustion chamber with a support structure and heat shield secured thereto.

BACKGROUND OF THE INVENTION

Heat shields are used for example in combustion chambers or flame tubes, which may be part of a furnace, a hot gas duct or a gas turbine and in which a hot medium is produced or ducted. Gas turbine combustion chambers which are subject to a high level of thermal loading for example are therefore lined with a heat shield to protect against excessive thermal stressing. The heat shield typically comprises a number of heat shield elements disposed on a support structure to provide cover and screening the wall of the combustion chamber from the hot combustion waste gas.

In order not to impede the thermal expansion of the heat shield elements during contact with the hot combustion waste gas, they are secured to the support structure leaving gaps between adjacent heat shield elements.

Such a heat shield on a support structure is described for example in EP 0 558 540 B1. In this heat shield rectangular ceramic heat shield elements have a hot side to face the hot waste gas, a cold side to face the support structure and four peripheral sides connecting the hot side to the cold side. The heat shield is provided in particular for attachment to the support structure of an axially symmetrical combustion chamber. The heat shield elements are retained by means of retaining elements, having a fixing section for fixing to the support structure and a retaining section to engage in grooves on peripheral sides of the heat shield elements. Those peripheral sides of the heat shield elements, in which the grooves are provided to engage with the engaging sections, extend along the axial direction of the axially symmetrical combustion chamber. Two peripheral sides provided with grooves therefore lie at opposing ends of a heat shield element when viewed in the peripheral direction of the combustion chamber.

In the heat shield in EP 0 558 540 B1 the heat shield elements are fixed in the peripheral direction of the combustion chamber by the engagement of retaining elements fixed to the support structure in the grooves of the peripheral sides. They are however not securely fixed in the axial direction of the combustion chamber, as an axial fixing system is not provided. If the tolerances are distributed unfavorably, for example if all the heat shield elements are at the lower tolerance band, the gaps between adjacent heat shield elements can increase due to displacement of the heat shield elements in the axial direction, resulting in increased penetration of hot gas into the gaps.

Generally the gaps between heat shield elements are shielded against penetration of hot gas by means of barrier air, in other words pressurized air, which flows through the gaps into the combustion chamber. If large gaps, which can occur due to axial displacement, have to be taken into account, this increases the barrier air required to block the large gaps adequately. For ceramic heat shield elements in the area of large gaps the increased flow of barrier air results in a higher temperature gradient within these heat shield elements. The increased temperature gradient in turn results in increased crack formation in the area of the edges of the ceramic heat shield elements and also in the cracks being longer than with a smaller temperature gradient.

SUMMARY OF INVENTION

The object of the present invention is to provide a retaining element and a heat shield element, with which an advantageous heat shield can be constructed in particular on the support structure of an axially symmetrical gas turbine combustion chamber. A further object of the present invention is to provide a combustion chamber, in particular an axially symmetrical gas turbine combustion chamber, or a flame tube with an advantageous heat shield.

The first object is achieved by a retaining element or a heat shield element, the second object by a combustion chamber. The dependent claims contain advantageous refinements of the invention.

An inventive retaining element for retaining a heat shield element on a support structure, which can in particular be made of metal, comprises at least one fixing section configured to fix the retaining element to the support structure, also referred to as the shoe, and at least one retaining section, also referred to as the retaining head, which is configured to engage in an engaging groove present in a peripheral surface of a heat shield element. The retaining element also has a projection, which is disposed so that it projects in the direction of the retained heat shield element when a heat shield element is being retained, in particular in the direction of the surface of the heat shield element next to the retaining element.

The projection of the inventive retaining element allows engagement in a recess present in the heat shield element, as a result of which the heat shield element can be secured against displacement in a direction parallel to the peripheral surface provided with the groove.

A corresponding heat shield element, which can be configured in particular as a ceramic heat shield element, has a cold side to face the support structure, a hot side to face away from the support structure, in other words to face the combustion chamber interior, and peripheral sides connecting the cold side to the hot side. In at least one peripheral side, preferably in two peripheral sides at ends of the heat shield element facing away from each other, there is an engaging groove, which is bounded in the direction of the cold side by a cold-side material bar, in the direction of the hot side by a hot-side material bar and in the direction of the interior of the heat shield element by a groove base. At least one material recess is present in a section of a material bar or the groove base, which is located in an area of the engaging groove provided to engage with a retaining element. The projection of an inventive retaining element can engage in this material recess.

In one refinement of the invention the material recess is disposed in the cold-side material bar. In this instance the projection present in the retaining element can be configured for example in the form of a cylindrical lug disposed on the retaining section, a hook disposed on the retaining section or the tip of a v-shaped area of the retaining section in the retaining section.

If there is a transition section present between the fixing section and the retaining section, the projection can also be disposed in the transition section. In this instance the projection can be configured for example as a block-type lug or a curved area, which is curved in such a manner that it projects in the direction of the heat shield element when heat shield element is being retained.

The material recess in the cold-side material bar can be present either on the groove side of the material bar or on the cold-side side of the material bar. It can in particular also extend from the groove side of the material bar through the entire material bar out to the cold side of the material bar. A v-shaped molding can for example be present as the material recess in the groove side of the material bar.

An inventive combustion chamber, which can be configured for example as a gas turbine combustion chamber and in particular as an axially symmetrical gas turbine combustion chamber or an inventive flame tube, comprises a support structure and a heat shield secured to the support structure. The heat shield is made up of a number of inventive heat shield elements and a number of inventive retaining elements. The heat shield elements are disposed by means of the retaining elements on the support structure to provide cover with gaps left between, with the projections of the retaining elements engaging with the material recesses of the heat shield elements. This engagement allows the heat shield elements to be protected against displacement in relation to the support structure. Fixing of the heat shield elements in the axial direction can be effected in particular in axially symmetrical combustion chambers or flame tubes, in which the heat shield elements are fixed in the peripheral direction by engagement of the retaining elements in the grooves.

The heat shield elements are preferably ceramic heat shield elements and the retaining elements are preferably metal retaining elements.

BRIEF DESCRIPTION OF THE DRAWINGS

Further features, characteristics and advantages of the present invention will emerge from the description which follows of exemplary embodiments with reference to the accompanying figures in which.

DETAILED DESCRIPTION OF INVENTION

Figure 1:
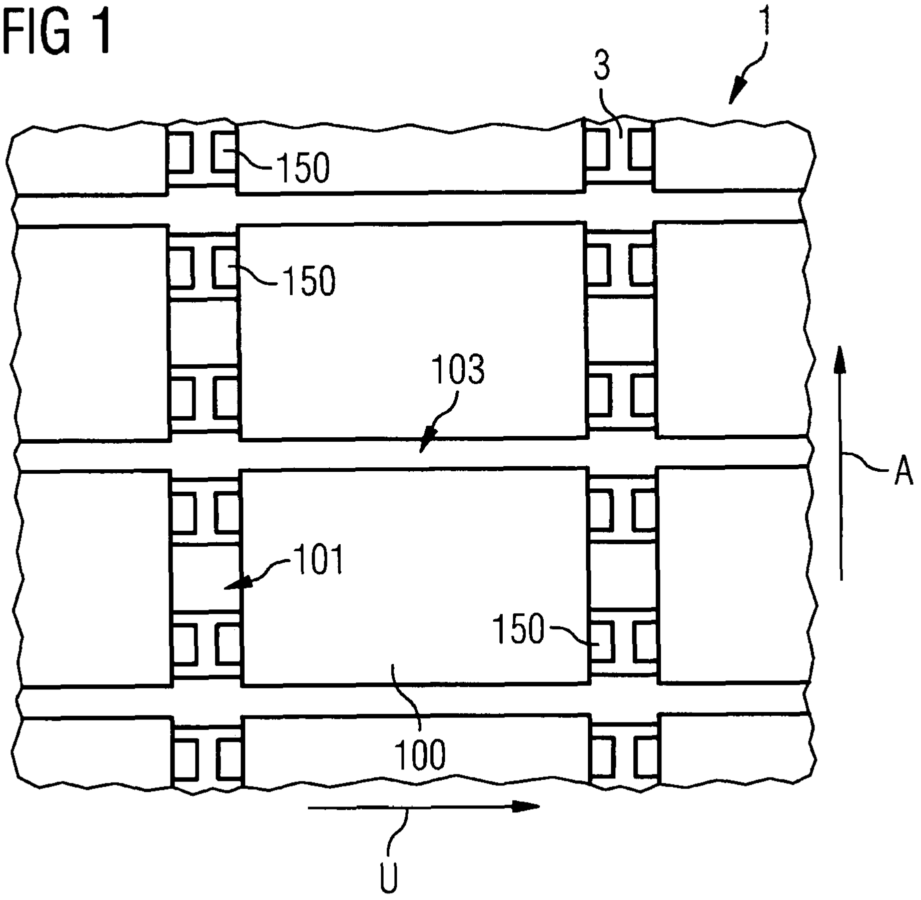
FIG. 1 shows a schematic diagram of a section from a heat shield on a support structure.

FIG. 1 shows a section from an axially symmetrical gas turbine combustion chamber as an exemplary embodiment of an inventive combustion chamber. The axial direction is indicated by the arrow marked A in FIG. 1.

The combustion chamber 1 has a support structure 3 and a heat shield secured to the support structure 3, made up of a number of heat shield elements 100, which are retained on the support structure 3 by means of retaining elements 150. The heat shield elements 100 are disposed on the support structure 3 to provide cover, leaving gaps 101, 103 between, in the peripheral direction U and axial direction A of the combustion chamber, with the retaining elements 150 projecting into the gaps 101 running in the axial direction A. To block the gaps to prevent the ingress of hot gas, said gaps can be flushed with pressurized air.

Figure 2:
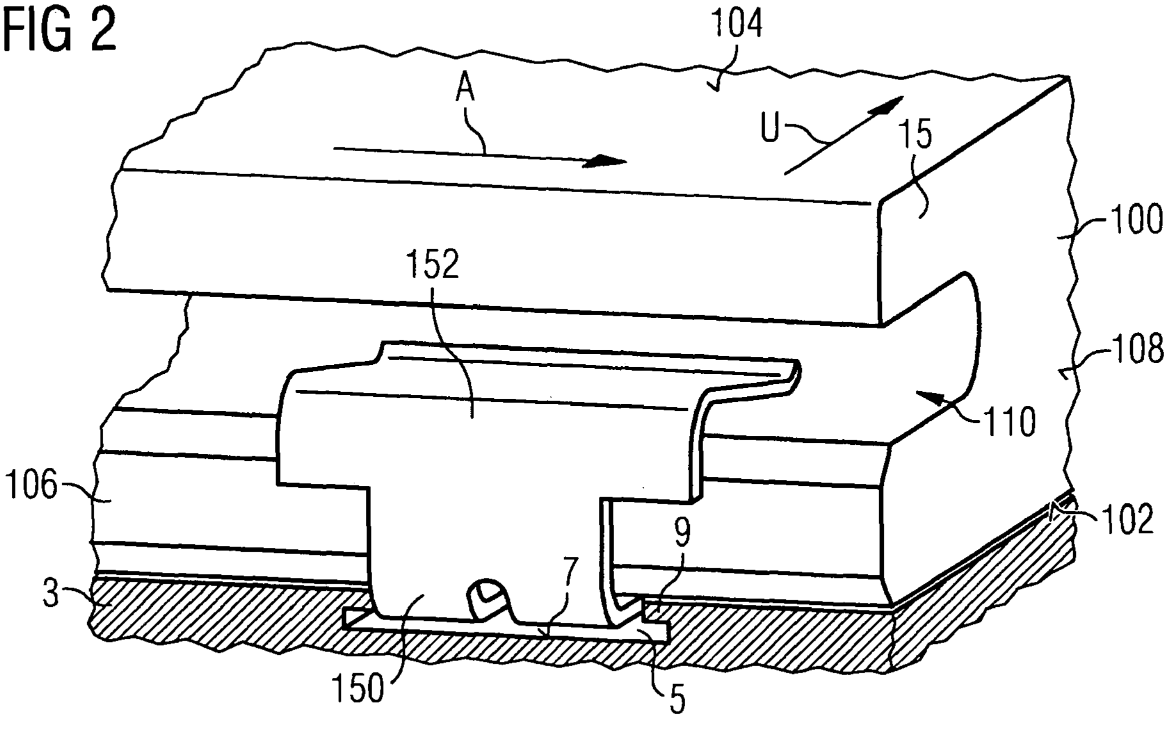
FIG. 2 shows a heat shield element fixed to the support structure by means of a retaining element.

A heat shield element 100 and a retaining element 150 securing the heat shield element to the support structure 3 are shown in detail in FIG. 2. The heat shield element 100 has a cold side 102 facing the support structure, a hot side 104 facing away from the support structure and peripheral sides 106, 108 connecting the cold side 102 to the hot side 104. The peripheral sides 108 hereby extend in the peripheral direction U of the combustion chamber and the peripheral sides 106 in the axial direction A. The peripheral sides 106 are provided with a groove 110, which also extends in the axial direction of the combustion chamber. A retaining section 152 of the retaining element 150, hereafter referred to as the retaining head, engages in the groove 110.

The retaining element 150 is guided in a groove 5 of the support structure 3. A widened fixing section (not shown in FIG. 2) of the retaining element 150, the so-called shoe of the retaining element 150, hereby engages with close tolerance in the approx. 10 mm deep groove 5 let in parallel to the surface of the support structure 3. The groove 5 is embodied in such a manner that it only has the width necessary for insertion of the shoe in the groove base 7. If the retaining element 150 is drawn up in the groove 5, it comes up against a narrow area 9 of the groove 5, as a result of which a retaining force to retain the retaining element 150 is exercised. An unwidened part of the retaining element 150 can be lifted up in the groove 5 without obstacle.

The heat shield elements 100 are generally retained by two retaining elements 150 respectively on two sides facing away from each other in the peripheral direction of the gas turbine combustion chamber, in other words by a total of four retaining elements 150. The retaining elements 150 on one of the two sides at least are secured to the support structure 3 by means of two locking units for example in the region of the shoe. The shoes of the retaining elements 150 disposed on the other side are not secured, so that they can slide, in order not to impede the thermal expansion of the heat shield element. This type of fixing allows the heat shield elements to be fixed very securely in the peripheral direction of the gas turbine combustion chamber 1.

The heat shield elements are fixed in the axial direction of the gas turbine combustion chamber in that the retaining elements have projections, which engage in material recesses in the heat shield elements. This is described below with reference to FIGS. 3 to 11.

Figure 3:
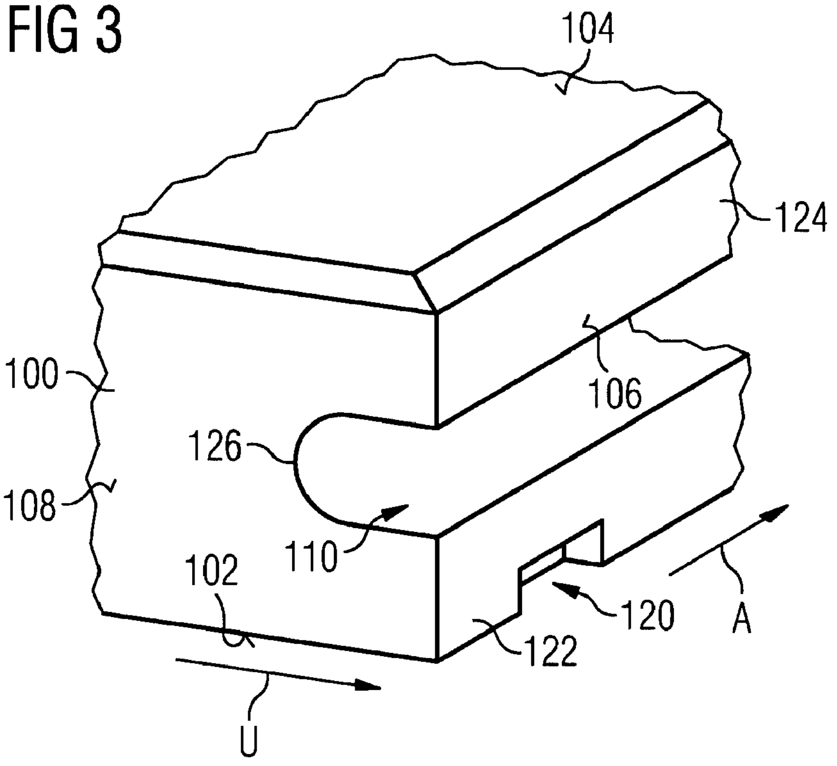
FIG. 3 shows a first exemplary embodiment of an inventive heat shield element.

FIG. 3 shows a first exemplary embodiment of a heat shield element 100 with a recess 120. The recess 120 is located in an area of the peripheral side 106, which is provided to engage with the retaining section of a retaining element 150.

The engaging groove 110, in which a retaining head 152 can engage, is bounded in the direction of the cold side 102 by a cold-side material bar 122, in the direction of the hot side 104 by a hot-side material bar 124 and in the direction of the interior of the heat shield element 100 by the groove base 126. The material recess 120 is located in the cold-side material bar 122, in the area of the cold side 102. It extends from the cold side 102 over about half the thickness of the cold-side material bar 122. Corresponding material recesses 120 are also present in the other bar sections, provided for engaging with retaining heads 152.

Figure 4:
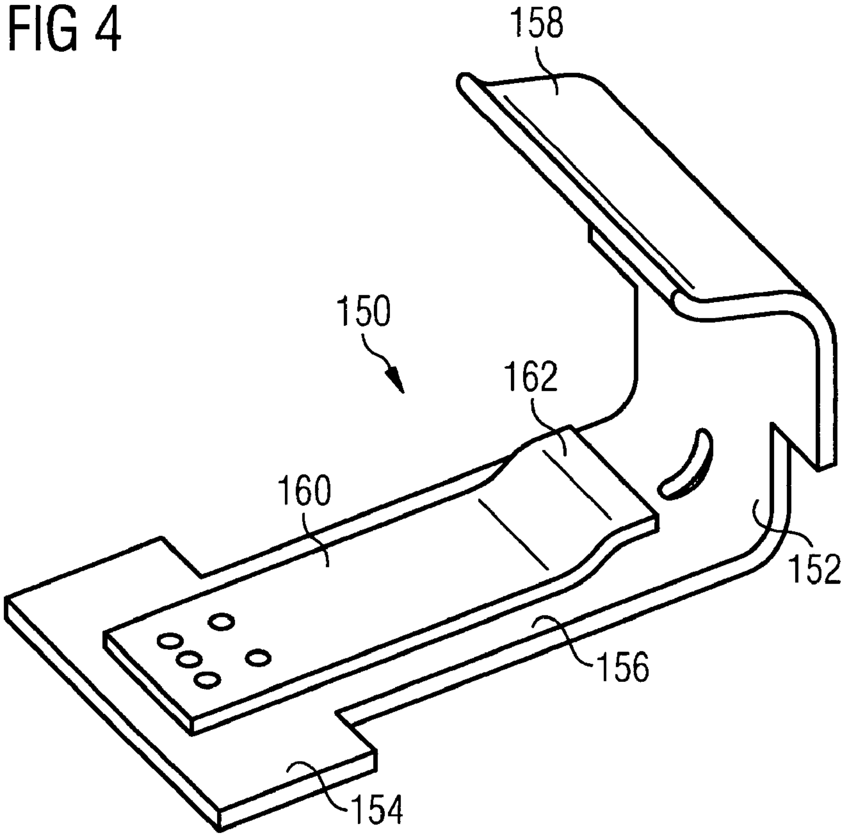
FIG. 4 shows a first exemplary embodiment of an inventive heat shield element.

The associated retaining element 150 is shown in FIG. 4. The figure shows the retaining head 152, the shoe 154 and a transition section, disposed between the retaining head 152 and the shoe 154. The shoe 154 is distinguished from the transition section 156 by a widened configuration and the retaining head 152 by an essentially right-angled bend.

The retaining head 152 is fitted with an engaging plate 158, which is angled away from the remainder of the retaining head 152 in such a manner that it is approximately parallel to the transition section 156.

A flat spring 160 is disposed in the area of the shoe 154 and the transition section 156, to ensure that the transition section 156 in FIG. 4 can only be lifted up in the groove 5 against the spring force of the flat spring (see FIG. 2). The flat spring 160 extends essentially over the entire transition section 156, which is why this is also referred to as the spring section or the spring for short.

The end 162 of the flat spring near the retaining head is bent away from the transition section 156 in the direction of the engaging plate 158. If the engaging plate 158 now engages in the groove 110 of the heat shield element 100 shown in FIG. 3, the end 162 of the flat spring 160 near to the retaining head, which is bent upward, engages in the material recess 120 in the cold-side material bar 122. This allows the heat shield element 100 to be fixed in the axial direction A of the combustion chamber.

Figure 5:
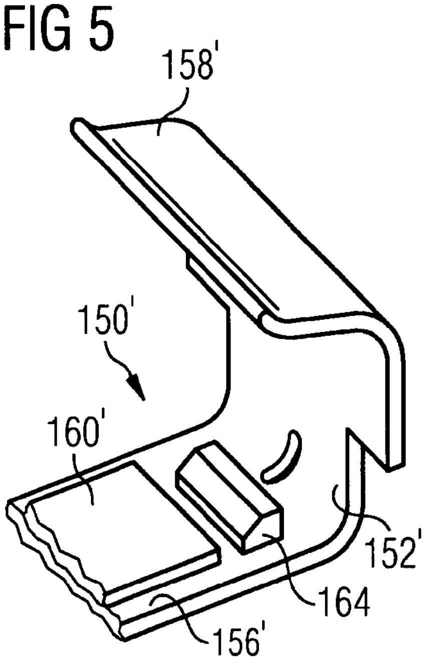
FIG. 5 shows a second exemplary embodiment of an inventive heat shield element.

A second exemplary embodiment of the inventive retaining element is shown in FIG. 5. In this variant of the retaining element 150' the flat spring 160' is shortened compared with the variant shown in FIG. 4. It does not have a section that bends upward either.

A block is welded to the transition section 156' between the flat spring 160' and the retaining head 152'. The block 164 projects here in the direction of the engaging plate 158' of the retaining element 150'. If the engaging plate 158' of the retaining element 150' engages in the groove 110 of the heat shield element 100 shown in FIG. 3, the upper side of the block 164 engages in the material recess in the cold-side material bar 122, thereby securing the heat shield element 100 against displacement in the axial direction A.

Figure 6:
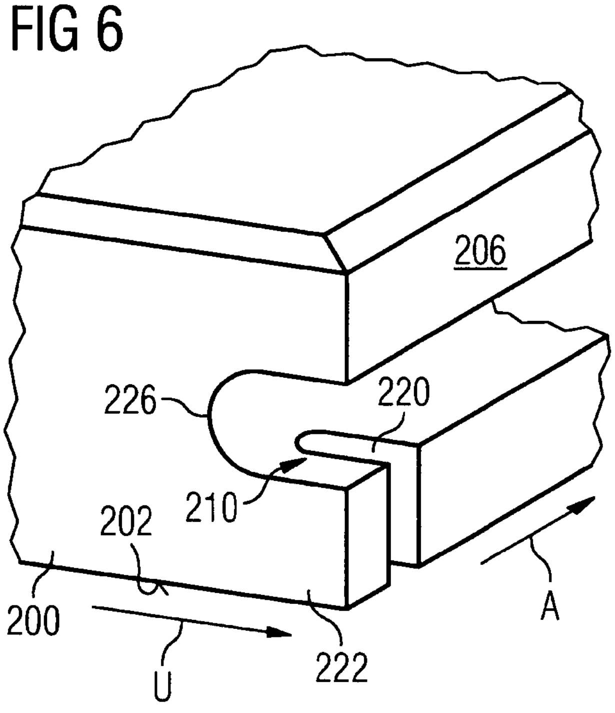
FIG. 6 shows a second exemplary embodiment of an inventive heat shield element.

A second exemplary embodiment of the inventive heat shield element is shown in FIG. 6. The heat shield element 200 shown in FIG. 6 differs from the heat shield element 100 shown in FIG. 3 essentially in that the recess 220 extends from the cold side 202 out to the groove 210 through the cold-side material bar 222.

Figure 7:
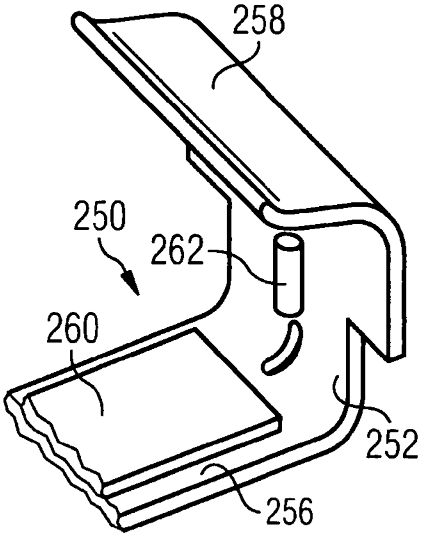
FIG. 7 shows a third exemplary embodiment of an inventive heat shield element.

A third exemplary embodiment of the inventive retaining element is shown in FIG. 7. The retaining element 250 shown in FIG. 7 differs from the retaining element 150 shown in FIG. 4 in that its flat spring 260 does not have a section that bends upward, but rests on the transition section 256 of the retaining element 250 over its entire length. A cylindrical section in the form of a small tube 262 welded to the retaining head 252 is present on the retaining head 252 of the retaining element 250. The small tube 262 is located in the section of the retaining head 252 angled at a right angle to the transition section 256 and engages in the material recess 220 of the heat shield element 200 shown in FIG. 6, when the gripping plate 258 of the retaining element 250 engages in the groove 210 of the heat shield element 200. The engagement of the small tube 262 in the material recess 220 thereby impedes displacement of the heat shield element in the axial direction A.

Figure 8:
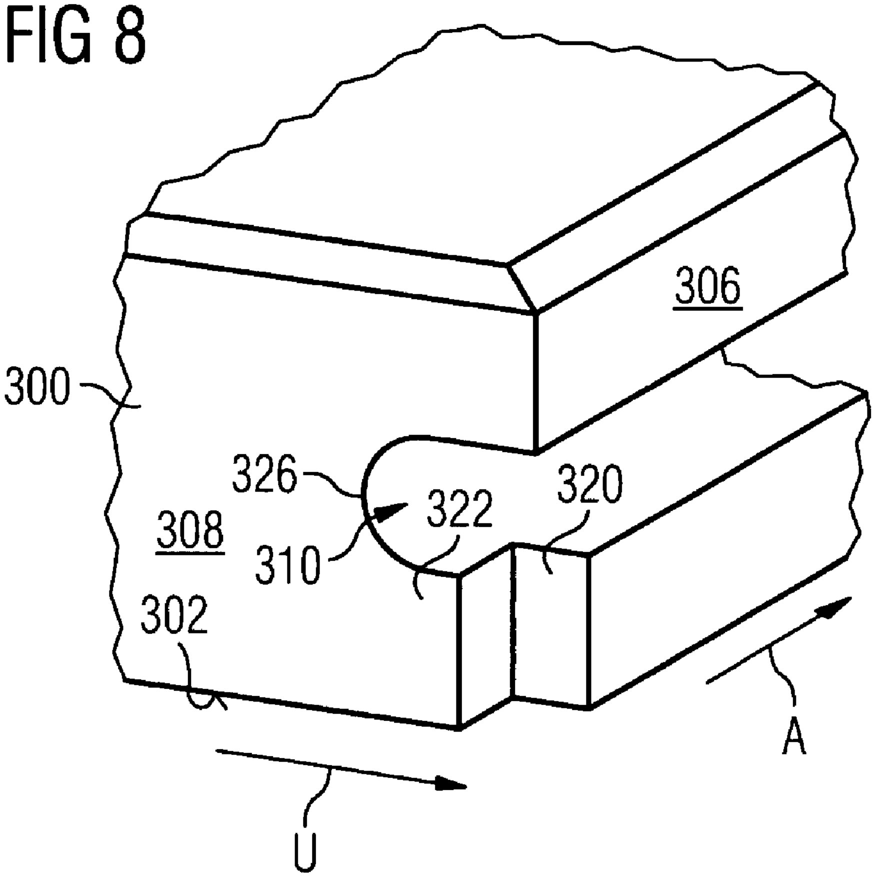
FIG. 8 shows a third exemplary embodiment of an inventive heat shield element.

A third exemplary embodiment of an inventive heat shield element is shown in FIG. 8. The cold-side material bar 322 also has a recess 320 in this exemplary embodiment. This recess 320 is located in the edge area of the material bar, where the peripheral side 306 running in the axial direction of the combustion chamber and the peripheral side 308 running in the peripheral direction of the combustion chamber meet. As in the exemplary embodiment shown in FIG. 6, the material recess 320 extends from the cold side 302 out to the groove 310 through the material bar 322.

Figure 9:
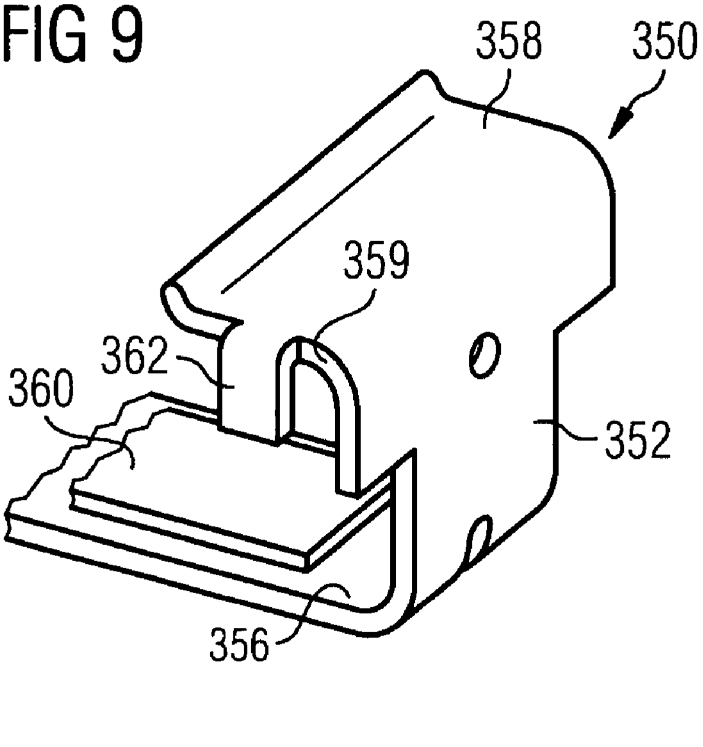
FIG. 9 shows a fourth exemplary embodiment of an inventive heat shield element.

A fourth exemplary embodiment of the retaining element 350, to be used in particular in conjunction with the heat shield element 300 shown in FIG. 8, is shown in FIG. 9. This retaining element has a hook-type lug 362 in the area of the gripping plate 358 as its projection. This hook-type lug 362 is disposed on an edge 359 of the gripping plate 358, which extends in the peripheral direction U of the combustion chamber, when the retaining element 350 is attached to the support structure and is bent away in the direction of the transition section 356.

When the gripping plate 358 engages in the groove 310 of the heat shield element 300 shown in FIG. 8, the hook-type lug 362 engages in the material recess 320, thus securing the heat shield element 300 against displacement in the axial direction of the gas turbine combustion chamber.

Figure 10:
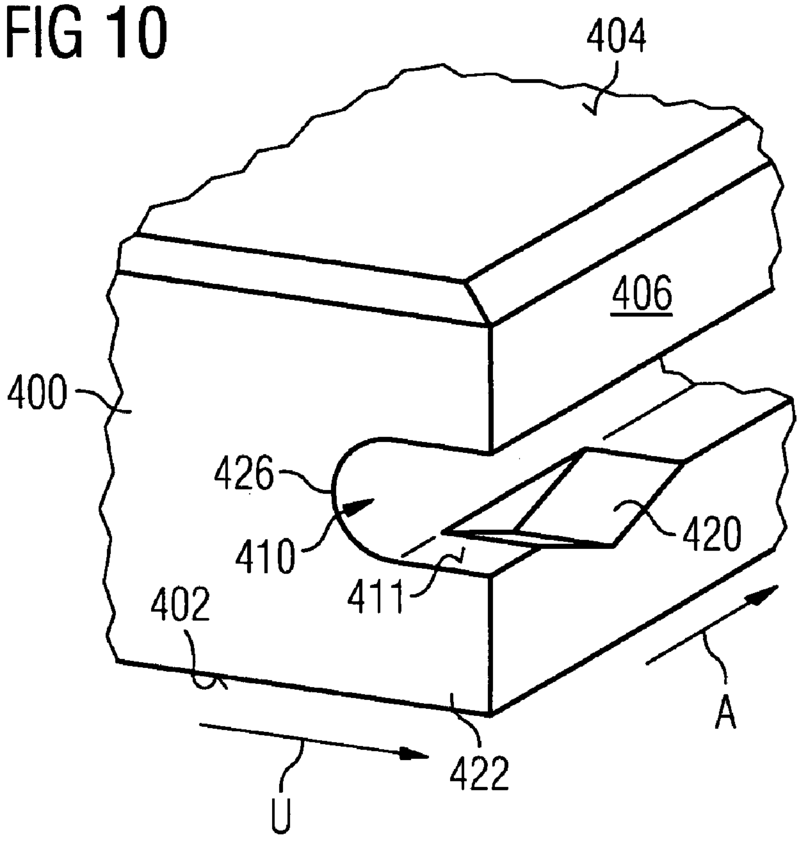
FIG. 10 shows a fourth exemplary embodiment of an inventive heat shield element.

A fourth exemplary embodiment of the inventive heat shield element is shown in FIG. 10. In this heat shield element 400 the material recess 420 is located in the groove side of the cold-side material bar 422, namely in the wall 411 of the groove 410 formed by the material bar 422. The recess 420 is embodied as a v-shaped molding in the material bar 422, the tip of which points in the direction of the cold side 402 of the heat shield element 400.

Figure 11:
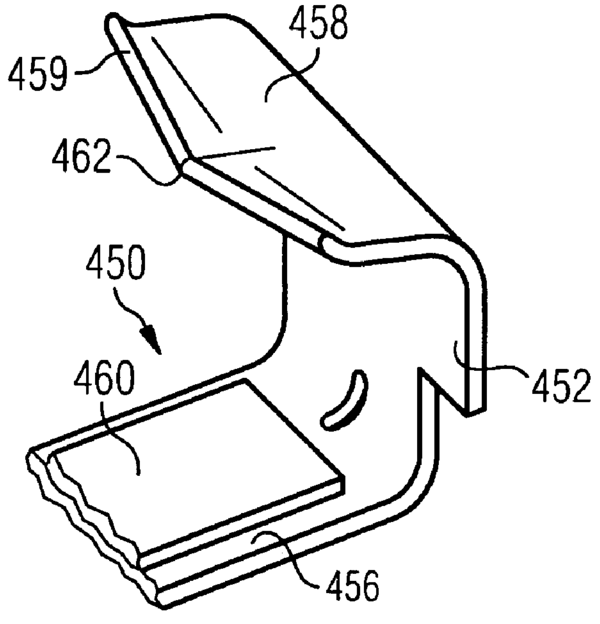
FIG. 11 shows a fifth exemplary embodiment of an inventive heat shield element.

The associated retaining element 450 is shown in FIG. 11. In the retaining element 450 the gripping plate 458 of the retaining head is bent into a v-shape in the area of the front edge 459, with the tip 462 pointing in the direction of the transition section 456. The v-shape of the gripping plate 458 is hereby tailored to the v-shape of the material recess 420 in the cold-side bar 422 of the heat shield element 400. When the gripping plate 458 of the retaining element 450 engages in the groove 410 of the heat shield element 400, the v-shape impedes displacement of the heat shield element 400 in the axial direction A of the combustion chamber.

The described exemplary embodiments of heat shield elements and retaining elements allow a heat shield to be realized on the support structure of a combustion chamber, in which the heat shield elements are secured against displacement in the axial direction. In contrast to the exemplary embodiments shown, in which the material recess is present in the cold-side material bar, the recess can also in principle be present in the base of the groove or in the hot-side material bar. The arrangement of the recess in the cold-side material bar is however recommended, as the engaging plates of the retaining elements grip onto the cold-side material bar with a clamping action, allowing close contact between the retaining section and the material bar.

The exemplary embodiments were described with reference to a gas turbine chamber. It should however be noted that the invention can also be used to construct heat shield in flame tubes, in particular in axially symmetrical flame tubes.

The heat shield elements described in the exemplary embodiments, which can in particular be embodied as ceramic heat shield elements, can be manufactured from heat shield elements used to date, in that the material recesses are introduced later. Existing heat shields can therefore be modified by introducing the recesses into the heat shield elements and by inserting inventive retaining elements into an inventive heat shield. This modification can be carried out for example during regular maintenance operations. It is also possible just to replace individual heat shield elements gradually with inventive heat shield elements.

The inventive solution for axial fixing of the heat shield elements can also be deployed, when a ceramic mat is disposed on the cold side of the heat shield elements.

Compared with alternative proposed solutions, which include the provision of a bracket securing the heat shield elements against axial displacement, the inventive solution has the advantage that no additional components are required.

The axial fixing of the heat shield elements means that less large variations in gap widths occur. In particular particularly large gaps between adjacent heat shield elements can be avoided. The need for barrier air to block the gaps can thus be reduced, which also results in a reduction of the temperature gradients in the ceramic heat shield elements. As a result the thermal stresses in the ceramic heat shield element are reduced, resulting in fewer and shorter cracks compared with conventional heat shields. This means lower replacement rates and a longer service life for the heat shield element.

Axial securing of the heat shield elements also allows optimization of the tolerance concept, allowing assembly times to be reduced for new construction and service operations, since it is not necessary or at least less frequently necessary to adjust the gap tolerances by grinding at a later stage.

The invention claimed is:

1. A gas turbine combustion chamber, comprising:

a support structure;

a heat shield secured to the support structure where the heat shield comprises a plurality of heat shield elements having:

a cold side that faces a support structure, a hot side opposite the cold side that faces away from the support structure, and a plurality of peripheral sides where each peripheral side spans between adjacent edges of the cold side and hot sides, where at least one of the peripheral sides has an engaging groove, that is bounded in a direction of the cold side by a cold-side material bar, in a direction of the hot side by a hot-side material bar and in a direction of an interior of the heat shield element by a groove base, wherein a material recess is present in a section of the cold-side material bar or the groove base, located in an area of the engaging groove provided to engage with a retaining section of a retaining element;

a plurality of retaining elements having:

a fixing section that fixes the retaining element on the support structure, a retaining section arranged opposite the fixing section configured to engage the engaging groove in the peripheral side of the heat shield element, and a projection attached to the fixing section and configured such that the projection projects in a direction of the heat shield element when the heat shield element is retained, wherein the heat shield elements are retained to the support structure by the retaining elements to provide thermal protection of the combustion chamber, leaving gaps in between, and the projections of the retaining elements engage with the material recesses of the heat shield elements.

2. The combustion chamber as claimed in claim 1, wherein the combustion chamber is axially symmetrical.

* * * * *